US009980292B2

(12) United States Patent
Jauh et al.

(10) Patent No.: US 9,980,292 B2
(45) Date of Patent: May 22, 2018

(54) CONTENTION BASED UPLINK ORTHOGONAL FREQUENCY-DIVISION MULTIPLE ACCESS (OFDMA)

(71) Applicant: MEDIATEK INC., Hsinchu (TW)

(72) Inventors: Yuh-Ren Jauh, Taoyuan (TW); Ching-Hwa Yu, Tainan (TW); James June-Ming Wang, San Marino, CA (US); Chao-Chun Wang, Taipei (TW)

(73) Assignee: MEDIATEK INC., HsinChu (TW)

( * ) Notice: Subject to any disclaimer, the term of this patent is extended or adjusted under 35 U.S.C. 154(b) by 138 days.

(21) Appl. No.: 14/925,891

(22) Filed: Oct. 28, 2015

(65) Prior Publication Data

US 2016/0128102 A1    May 5, 2016

Related U.S. Application Data

(60) Provisional application No. 62/069,964, filed on Oct. 29, 2014, provisional application No. 62/135,329, filed on Mar. 19, 2015.

(51) Int. Cl.
| | |
|---|---|
| *H04W 74/08* | (2009.01) |
| *H04L 5/00* | (2006.01) |
| *H04W 72/02* | (2009.01) |
| *H04W 72/04* | (2009.01) |

(52) U.S. Cl.
CPC ........ *H04W 74/0833* (2013.01); *H04L 5/0007* (2013.01); *H04W 72/02* (2013.01); *H04W 72/042* (2013.01)

(58) Field of Classification Search
CPC ............................................... H04W 74/0833
See application file for complete search history.

(56) References Cited

U.S. PATENT DOCUMENTS

| | | | | |
|---|---|---|---|---|
| 6,792,439 | B2 * | 9/2004 | Schmidt ................... | G06F 7/58 708/250 |
| 7,043,751 | B1 * | 5/2006 | Fischer ............... | H04M 3/4228 726/4 |
| 7,095,754 | B2 * | 8/2006 | Benveniste ............. | H04L 47/10 370/445 |
| 7,274,708 | B2 * | 9/2007 | Benveniste ......... | H04L 12/4013 370/338 |

(Continued)

OTHER PUBLICATIONS

EPO, Search Report for the EP patent application 15192031.1 dated Feb. 10, 2016 (9 pages).

(Continued)

*Primary Examiner* — Gregory B Sefcheck
(74) *Attorney, Agent, or Firm* — Imperium Patent Works; Zheng Jin

(57) ABSTRACT

A method of performing contention-based uplink OFDMA transmission is proposed in accordance with one novel aspect. A wireless communications station (an AP) reserves both dedicated resource and contention resource for uplink OFDMA operation for a list of communications devices (STAs). For contention-based random access, the AP does not need to collect traffic requests from the STAs. The AP only needs to make simple resource arrangement. The AP only needs to specify the allocated resource for random access and the uplink OFDMA operation duration and timing for each uplink OFDMA packet. Each STA having traffic request will contend the resource based on a random access probability scheme.

18 Claims, 5 Drawing Sheets

(56) References Cited

U.S. PATENT DOCUMENTS

| | | | | |
|---|---|---|---|---|
| RE42,452 E * | 6/2011 | Halton | ............. | H04W 74/0875 370/320 |
| 7,965,631 B2 * | 6/2011 | Chin | ................. | H04W 74/085 370/230.1 |
| 8,032,574 B2 * | 10/2011 | Yamamoto | ............... | G06F 7/58 463/16 |
| 8,068,511 B2 * | 11/2011 | Reznik | ................ | H04L 1/0026 370/447 |
| 8,331,248 B2 * | 12/2012 | Hosein | ................ | H04W 72/08 370/252 |
| 8,493,994 B2 * | 7/2013 | Park | ..................... | H04W 48/08 370/448 |
| 8,526,317 B2 * | 9/2013 | Leconte | ............ | H04W 74/0816 370/252 |
| 8,730,936 B2 * | 5/2014 | Tong | ................ | H04L 12/40143 370/314 |
| 8,774,113 B2 * | 7/2014 | Larsson | ............. | H04W 74/008 370/329 |
| 9,037,137 B2 * | 5/2015 | Klatt | ..................... | H04W 48/02 370/235 |
| 9,113,433 B2 * | 8/2015 | Park | .................... | H04W 74/002 |
| 9,148,848 B2 * | 9/2015 | Li | ..................... | H04W 74/0833 |
| 9,301,319 B2 * | 3/2016 | Barriac | ................. | H04W 74/08 |
| 9,380,484 B2 * | 6/2016 | Ou | ................. | H04W 28/0205 |
| 9,491,780 B2 * | 11/2016 | Pang | ................ | H04W 74/0833 |
| 9,549,418 B2 * | 1/2017 | Kato | .................... | H04L 5/0007 |
| 9,565,550 B2 * | 2/2017 | Klatt | .................... | H04W 48/02 |
| 2009/0196273 A1 * | 8/2009 | Kwon | ................. | H04W 8/30 370/343 |
| 2011/0317633 A1 * | 12/2011 | Tan | .................... | H04L 27/2607 370/329 |
| 2016/0128102 A1 * | 5/2016 | Jauh | ................. | H04W 74/0833 370/329 |

OTHER PUBLICATIONS

Opportunistic Multi-Channel CSMA Protocol for OFDMA Systems, Hojoong Kwon et al., IEEE Transactions on Wireless Communications, vol. 9. No. 5, May 2010.

* cited by examiner

CONTENTION-BASED
UPLINK OFDMA

CONTENTION BASED UPLINK ORTHOGONAL FREQUENCY-DIVISION MULTIPLE ACCESS (OFDMA)

CROSS REFERENCE TO RELATED APPLICATIONS

This application claims priority under 35 U.S.C. § 119 from U.S. Provisional Application No. 62/069,964, entitled "CONTENTION BASED UPLINK OFDMA," filed on Oct. 29, 2014, the subject matter of which is incorporated herein by reference. This application also claims priority under 35 U.S.C. § 119 from U.S. Provisional Application No. 62/135,329, entitled, "EXTENSION CONTENTION BASED UPLINK OFDMA" filed on Mar. 19, 2015; the subject matter of which is incorporated herein by reference.

TECHNICAL FIELD

The disclosed embodiments relate generally to wireless communication, and, more particularly, to contention based uplink OFDMA.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. Recently, WLAN has seen exponential growth across organizations in many industries.

Orthogonal frequency division multiple access (OFDMA) technology is developed in the cellular network enabling multiple users sharing the same wideband at the same time. Such technology, however, is not developed for the WLAN network. How to adapt the OFDMA technology to the WLAN to enable multiple users sharing the same wideband remains a question. For a normal uplink OFDMA operation, an access point (AP) needs to collect the traffic requests from wireless devices (STAs), arranging and managing the resource used by STAs for the uplink OFDMA transmission. However, only using designated resource for uplink OFDMA may not be efficient.

In OFDM/OFDMA wireless systems, contention-based uplink transmission is commonly used for multiple user equipments (UEs) to transmit uplink data to a serving base station via a shared uplink channel. For example, a UE may request access and acquire ownership of an uplink channel to initiate transmission. Therefore, in WLAN, contention-based random access can also be used for uplink OFDMA operation. For contention-based random access, multiple STAs contend for shared resource.

To improve the efficiency of the WLAN network allowing multiple users to share the same wideband WLAN channel, improvement and enhancement are required for the WLAN network.

SUMMARY

A method of performing contention-based uplink OFDMA transmission is proposed in accordance with one novel aspect. A wireless communications station (an AP) reserves both dedicated resource and contention resource for uplink OFDMA operation for a list of communications devices (STAs). For contention-based random access, the AP does not need to collect traffic requests from the STAs. The AP only needs to make simple resource arrangement. The AP only needs to specify the allocated resource for random access and the uplink OFDMA operation duration and timing for each uplink OFDMA packet. Each STA having traffic request will contend the resource based on a random access probability scheme.

In one embodiment, a wireless communications device (STA) generates a first random number to determine a probability to contend for random access in a wideband communications network using uplink OFDMA. The STA receives a first frame specifying a second number of resource units (RUs) for random access. The first frame carries timing and duration information for the random access RUs. The STA determines whether it is allowed to contend for random access based on the first random number upon receiving the first frame. If access is not allowed, the STA updates the first random number and increases the access probability. The STA waits for subsequent random access. If access is allowed, the STA selects an RU and transmits an uplink frame via the selected RU. The STA re-generates the first random number for subsequent random access.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
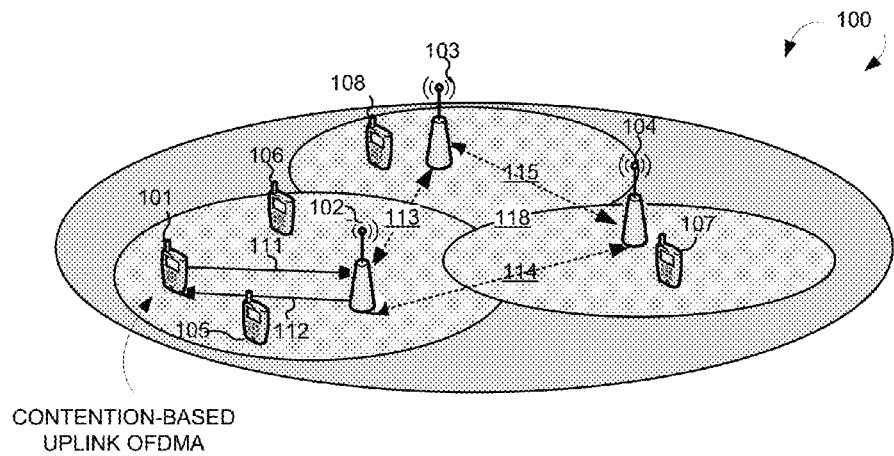
FIG. 1 illustrates an exemplary wireless network supporting contention-based OFDMA in accordance with embodiments of the current invention.

FIG. 1 illustrates an exemplary wireless communications network 100 using OFDMA in accordance with embodiments of the current invention. Wireless communications network 100 includes one or more wireless communications networks, each wireless communications network has a fixed base infrastructure unit, such as wireless communications stations 102 103, and 104, forming wireless networks distributed over a geographical region. The base unit may also be referred to as an access point, an access terminal, a wireless communication station, a Node-B, an eNode-B, or by other terminology used in the art. Each of the wireless communications stations 102, 103, and 104 serves a geographic area. Backhaul connections 113, 114 and 115 interconnect the non-co-located wireless communications stations, such as 102, 103, and 104 with each other. These backhaul connections can be either ideal or non-ideal.

A wireless communications device (STA) 101 in wireless network 100 is served by wireless communication station 102 via uplink 111 and downlink 112. Other wireless communications devices (STAs) 105, 106, 107, and 108 are served by different wireless communications stations. STAs 105 and 106 are served by wireless communications station 102. STA 107 is served by wireless communications station 104. STA 108 is served by wireless communications station 103.

In one embodiment, wireless communications network 100 is an OFDMA system comprising wireless communications stations/access points (APs) 102, 103 and 104, and a plurality of wireless communications devices, such as wireless stations (STAs) 101, 105, 106, 107 and 108. In the applications, each wireless communications station serves multiple wireless communications devices that transmit packets using uplink OFDMA. In some scenarios, multiple number of wireless devices contending for the wireless channel access at the same time and resulting in collisions. For a normal uplink OFDMA operation, an AP needs to collect the traffic requests from STAs, and arranging and managing dedicated the resource used for uplink OFDMA transmission. However, only using dedicated resource for uplink OFDMA transmission may not be efficient.

In one novel aspect, a contention-based uplink OFDMA transmission scheme is proposed. AP reserves both dedicated resource and contention resource for uplink OFDMA operation. For contention-based random access, AP does not need to collect traffic requests and only needs to make simple resource arrangement. For example, AP 102 does not need to collect the traffic requests from STA 101, STA 105, and STA 106. AP 102 only needs to specify the allocated resource for random access and the uplink OFDMA operation duration and timing for each uplink OFDMA packet. Each STA having traffic request will contend the resource based on a random access probability scheme.

Figure 2:
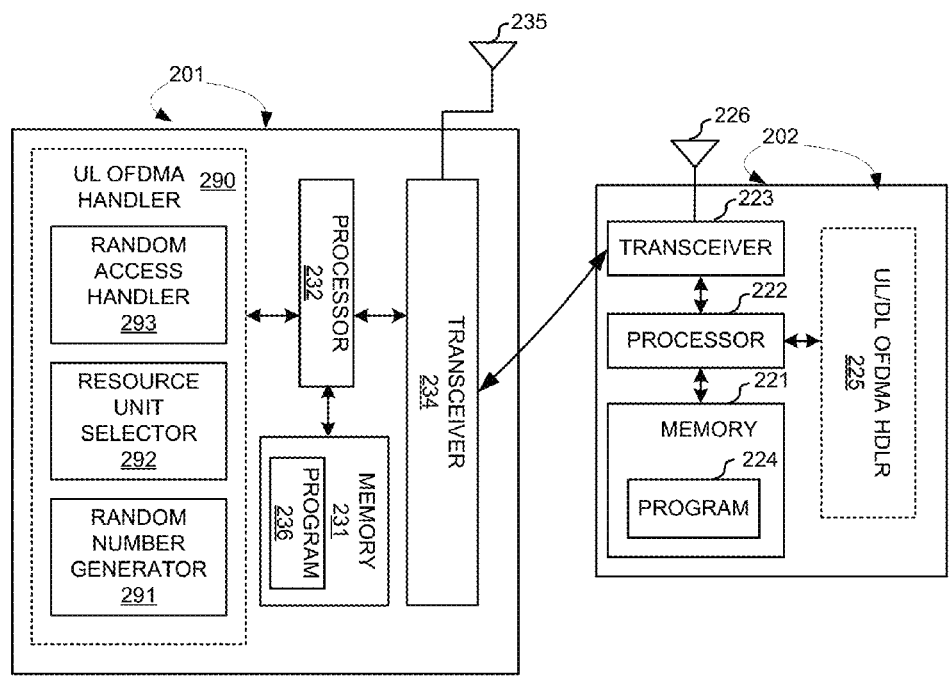
FIG. 2 illustrates an exemplary block diagram in a wireless system configured with contention-based OFDMA in accordance with embodiments of the current invention.

FIG. 2 illustrates an exemplary block diagram in a wireless system configured with contention-based OFDMA in accordance with embodiments of the current invention. Wireless communications station AP 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in wireless communications station AP 202. Memory 221 stores program instructions and data 224 to control the operations of wireless communications station AP 202. Wireless communications station 202 also includes a set of control modules, such as uplink (UL)/downlink (DL) OFDMA handler 225 that handles tasks related to OFDMA handling in wireless communications station 202.

Similarly, wireless communications device STA 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in wireless communications device STA 201. Memory 231 stores program instructions and data 236 to control the operations of wireless communications device STA 201.

Wireless communications device STA 101 also includes a set of control circuits that carry out functional tasks. An OFDMA handler comprises both DL OFDMA handler and UL OFDMA handler. The DL OFDMA handler receives OFDMA data frames from a wireless communications station using a downlink wideband channel comprising a number of narrow sub-bands in a WLAN network. The UL OFDMA handler 290 transmits OFDMA data frames to a wireless communications station using a narrow sub-band channel selected from an uplink wideband channel. The UL OFDMA handler 290 further comprises a random number generator 191 that generates a random number for determining access probability, a resource unit selector 292 for selecting a resource unit/sub-band for uplink OFDMA packet transmission, and a random access handler 293 for determining and updating random access probability for each uplink OFDMA opportunity.

Figure 3:
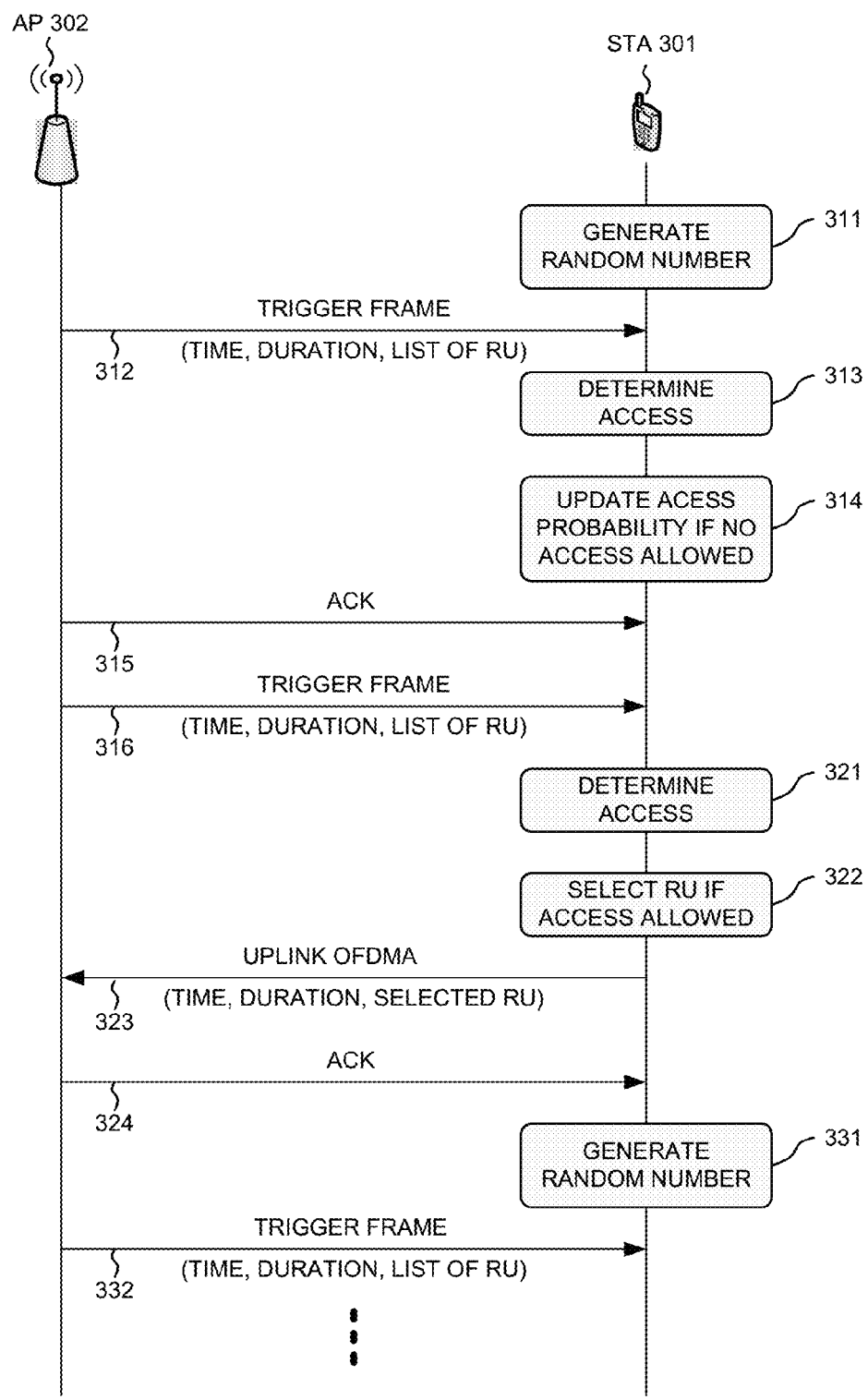
FIG. 3 illustrates an exemplary message flow of contention-based OFDMA transmission.

FIG. 3 illustrates an exemplary message flow of contention-based OFDMA transmission between an AP 302 and an STA 301. In step 311, STA 301 generates a random number (e.g., from integer 0 to 20). The random number is indicative of an initial access probability to the wireless channel—the larger the number is, the smaller the access probability. In step 312, AP 302 transmits a trigger frame to a plurality of STAs served by the AP. The trigger frame comprises information for uplink OFDMA transmission. For example, the trigger frame comprises a list of resource units (or sub-bands) allocated for random access, duration and timing for each OFDMA packet. In one example, a resource unit occupies a 20M sub channel, and up to nine (9) resource units may be allocated for random access. In step 313, STA 301 determines its access probability based on the random number, e.g., by comparing the random number with the number of allocated resource units. If access is not allowed, then in step 314, STA 301 updates its access probability, e.g., by subtracting the random number with the number of allocated resource units. In step 315, AP 302 transmits an acknowledgement (ACK) frame to the plurality of STAs. The ACK frame indicates the status of each OFDMA packet.

In step 316, AP 302 transmits another trigger frame to the plurality of STAs served by the AP. The trigger frame comprises information for uplink OFDMA transmission. In step 321, STA 301 determines its updated access probability based on the random number updated in step 314. If access is allowed, in step 322, STA 301 selects a resource unit from the number of allocated resource units specified by the trigger frame. The selected RU or sub-band in general has the best (or good enough) channel response for uplink. STA 301 can also select the sub-band according to the statistics of sub-band availability and interference condition. In step 323, STA 301 transmits an OFDMA packet to AP 302 using the selected resource unit. The OFDMA packet can be a data frame, a control frame, or a management frame. In step 324, AP 302 transmits an acknowledgement (ACK) frame to the plurality of STAs. Steps 311 through 324 complete one UL OFDMA operation. The contention-based uplink OFDMA operation starts again from step 331. In step 331, STA 301 generates another random number for determining its initial access probability for subsequent OFDMA operation. In step 332, AP 302 transmits a trigger frame to a plurality of STAs served by the AP, and so on so forth.

Figure 4:
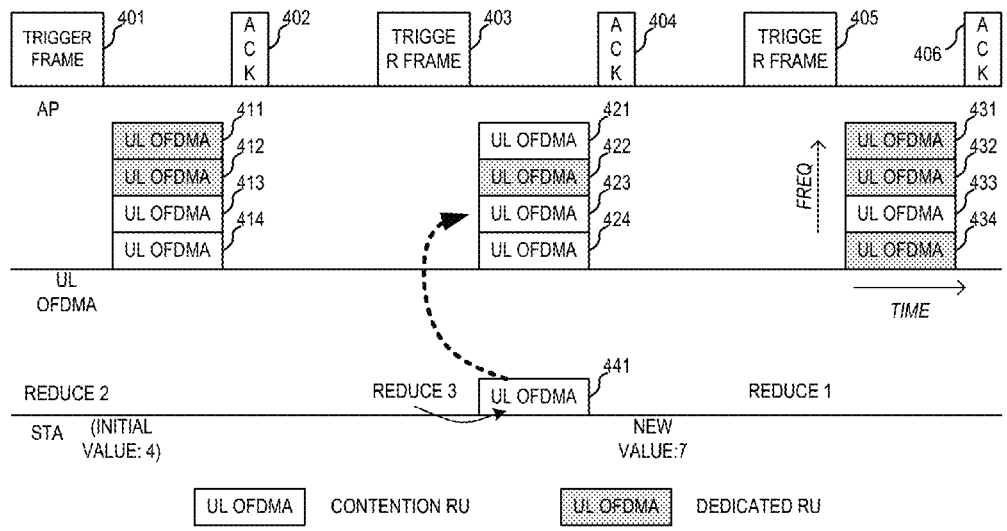
FIG. 4 illustrates one embodiment of contention-based uplink OFDMA using trigger frame.

FIG. 4 illustrates one embodiment of contention-based uplink OFDMA using trigger frame. In the example of FIG. 4, an AP serves a plurality of STAs for UL OFDMA. The AP triggers UL OFDMA transmission via sending trigger frames to the STAs. For example, the AP sends a first trigger frame 401 to the STAs. Trigger frame 401 specifies that two resource units 413 and 414 allocated for random access for the next OFDMA transmission, and the duration and timing of the OFDMA packets. During the same time, the AP can also reserve dedicated resource units 411 and 412 for other specific STAs for uplink OFDMA transmission. At STA side, each STA have uplink OFDMA request or data to send will generate an initial value, which is associated with its initial access probability. For example, the initial value can be randomly generated from number 0 to 20, and the larger the number is, the lower the access probability will be.

In the example of FIG. 4, the STA generates a random number with an initial value of four (e.g., $n1=4$, generated from range 0 to 20). Upon receiving the trigger frame 401, the STA compares the initial value $n1=4$ with the number of allocated resource units, which is two ($n2=2$) multiplied by a weighting factor (e.g., weighting factor $w=1$). Because the random number $n1=4$ is larger than the number of resource units $n2*w=2$, the STA is not allowed to contend for the share wireless channel. As a result, the STA updates the random number by subtracting the random number by two: updated number $n1=4-2=2$. Later, the AP transmits another trigger frame 403. This trigger frame specifies that three resource units 421, 423, and 424 allocated for random access for the next OFDMA transmission, and the duration and timing of the OFDMA packets. Upon receiving the trigger frame 403, the STA compares the updated value $n1=2$ with the number of allocated resource units, which is three ($n2=3$) multiplied by a weighting factor (e.g., weighting factor $w=1$). Because the updated random number $n1=2$ is smaller than the number of resource units $n2*w=3$, the STA is now allowed to contend for the share wireless channel. As a result, the STA transmits an uplink OFDMA packet 441 to the AP using a selected sub-band (e.g., resource unit RU 423 is selected), which completes one OFDMA operation. If the STA does not find suitable sub-band or resource unit in the currently uplink packet, then the STA can defer its uplink opportunity to the next uplink packet. Note that when updating the random number, in an alternative example, the STA can subtract the random number $n1$ by the number of allocated resource units $n2$ multiplied by a weighting factor $w$. The weighting factor $w$ can be a fixed predefined number, or can be dynamically configured by the AP via each trigger frame.

After each OFDMA packet transmission, the STA also generates a new random number (e.g., $n1=7$ from 0 to 20) for subsequent random access. Note that the STA receives ACK frame 404 indicating whether UL OFDMA packet 441 has been successfully received by the AP. If collision happens, then the STA needs to generate the new random number from an increased range (e.g., $n1'=11$ from 5 to 25) to reduce access probability and thereby reducing potential collision from the random access. Later, the AP sends another trigger frame 405 to the STAs. Trigger frame 405 specifies that only one resource unit 433 allocated for random access for the next OFDMA transmission, and the duration and timing of the OFDMA packets. Upon receiving the trigger frame 405, the STA compares the initial value $n1=7$ with the number of allocated resource units, which is one ($n2=1$). Because the random number $n1=7$ is larger than the number of resource unit $n2=1$, the STA is not allowed to contend for the share wireless channel. As a result, the STA updates the random number by subtracting the random number by one: updated number $n1=7-1=6$. The updated value $n1=6$ will be used to determine access probability of the STA for the next OFDMA opportunity.

In the above embodiment, each trigger frame triggers one OFDMA packet transmission. In other embodiments, an AP can specify the uplink OFDMA operation duration, which contains multiple uplink OFDMA packet transmissions. For example, Clear-to-Send (CTS)+Operation Mode Announcement (OMA) can be used for this purpose. Further, if the OFDMA transmission is triggered by STA Request-to-Send (RTS), then RTS+CTS+OMA can be used. Other examples include MU-RTS/MU-CTS.

From AP perspective, the AP first sends a CTS frame followed by an OMA frame. The OMA frame specifies the start timing and packet duration for each subsequent OFDMA packet. The AP can specify all the STAs or only a special group of STAs utilize the reserved uplink timing. When arranging the uplink OFDMA packet timing, the AP can consider 1) whether ACK for the uplink OFDMA is required or not, and 2) the purpose of uplink OFDMA packet is for short packet (e.g., management or control or short data) or long packet. If for long packet, then the contention penalty for long packet needs to be considered.

From STA perspective, an STA having uplink OFDMA request will set a countdown value. This value can be randomly selected value from an initial window size plus an offset value. If collision happen, STA needs to randomly select a new value from an increase-sized window. The uplink OFDMA countdown value will count down for every AP assigned timing of uplink OFDMA packet (for every uplink opportunity). STA count down to zero can transmit in the next uplink OFDMA packet. STA may or may not count down if the required airtime is larger than the current reserved uplink packet duration. If STA has multiple uplink requests with different packet durations, it may keep one countdown counter or maintain multiple countdown counters. STA can transmit its uplink OFDMA packet in specific subband. This subband is generally the best subband for the STA. STA can also select from several candidate sub-bands according to the previous subband occupancy, interference, and collision statistics. If the uplink OFDMA operation is triggered by a specific STA via RTS, then specific subband(s) for the first uplink OFDMA packet (maybe with following OFDMA packets) can be reserved for that specific STA.

Figure 5:
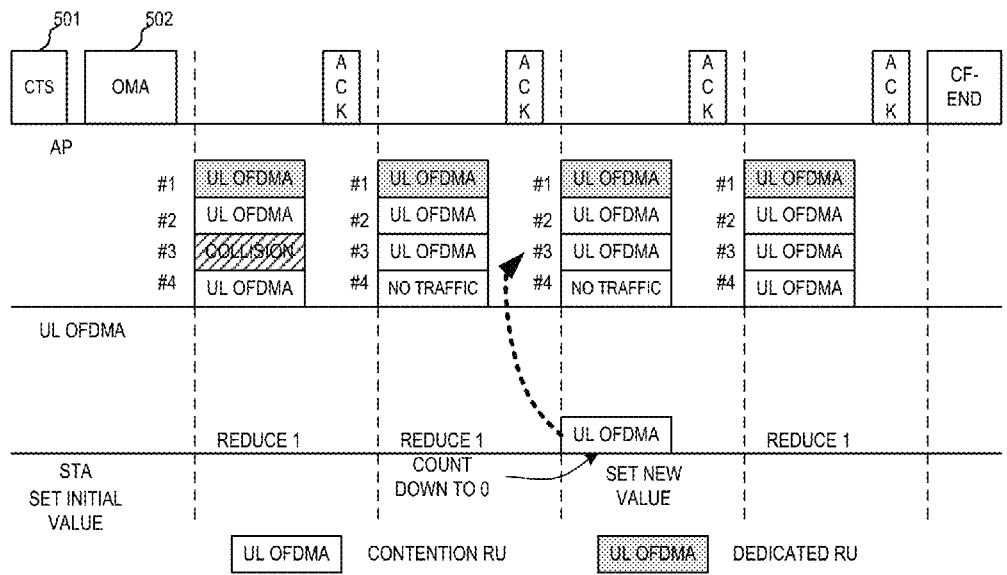
FIG. 5 illustrates one embodiment of contention-based uplink OFDMA based on CTS+OMA, where each uplink OFDMA transmission is followed by a corresponding acknowledgement frame.

FIG. 5 illustrates one embodiment of contention-based uplink OFDMA based on CTS+OMA, where each uplink OFDMA transmission is followed by a corresponding acknowledgement frame. In the example of FIG. 5, an AP serves a plurality of STAs. The AP first sends a CTS frame 501 followed by an OMA frame 502. The OMA frame 502 specifies the allocated resource units, the start timing and the packet duration for each subsequent OFDMA packet for the next four UL OFDMA opportunities. For example, resource unit #1 is reserved for dedicated transmission, and resource units #2, #3, and #4 are reserved for random access contention. Note that for each uplink opportunities, the number of dedicated RU and the number of contention RU may vary.

At the beginning, the STA sets an initial countdown value (e.g., n=2 is selected from an initial window 0-10). This countdown value is indicative of an access probability of the STA. For the first uplink opportunity, because the initial countdown value n≠0 (e.g., not counting down to zero), the STA is not allowed to contend for channel access. The STA then reduces its countdown value by one (n=n−1) (or by a predefined number, or multiplied with weighting factor). By counting down the countdown value, the access probability of the STA increases. For the second uplink opportunity, the updated countdown value n≠0, the STA is still not allowed to contend for channel access. The STA then again reduces its countdown value by one (n=n−1) (or by a predefined number, or multiplied with weighting factor) to increase its subsequent random access probability.

For the third uplink opportunity, the countdown value is already counting down to zero. As a result, the STA is allowed to contend for channel access. The STA thus selects a suitable sub-channel, e.g., RU #3 and transmits its uplink OFDMA packet to the AP. After the uplink transmission, the STA sets a new countdown value, which is used to determine its channel access opportunity for the next uplink opportunity. Note that if collision happens, the STA needs to randomly select the new countdown value from an increase-sized window (e.g., n=9 is selected from window 5 to 15). For the fourth uplink opportunity, because the new initial countdown value 0, the STA is not allowed to contend for channel access. The STA then reduces its countdown value by one (n=n−1) (or by a predefined number) to increase its access probability for subsequent random access.

Figure 6:
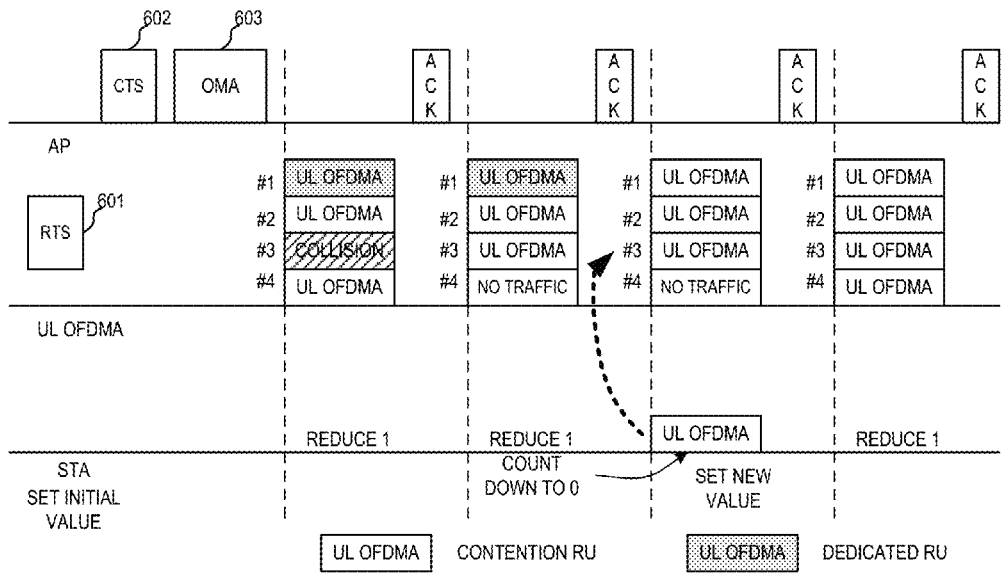
FIG. 6 illustrates one embodiment of contention-based uplink OFDMA based on RTS+CTS+OMA, where each uplink OFDMA transmission is followed by a corresponding acknowledgement frame.

FIG. 6 illustrates one embodiment of contention-based uplink OFDMA based on RTS+CTS+OMA, where each uplink OFDMA transmission is followed by a corresponding acknowledgement frame. The embodiment of FIG. 6 is similar to the embodiment of FIG. 5. In the embodiment of FIG. 6, the uplink OFDMA operation is triggered by one of the STAs by sending an RTS 601 frame to the AP. Upon receiving the RTS frame 601, the AP sends a CTS frame 602 followed by an OMA frame 603. The OMA frame 603 specifies the allocated resource units, the start timing and the packet duration for each subsequent OFDMA packet for the next four UL OFDMA opportunities. For example, resource unit #1 is reserved for dedicated transmission for the first and the second uplink opportunities, and all remaining resource units are reserved for random access contention. In this specific example, the dedicated resource unit #1 may be reserved for the STA that triggers the operation by RTS frame 601.

Figure 7:
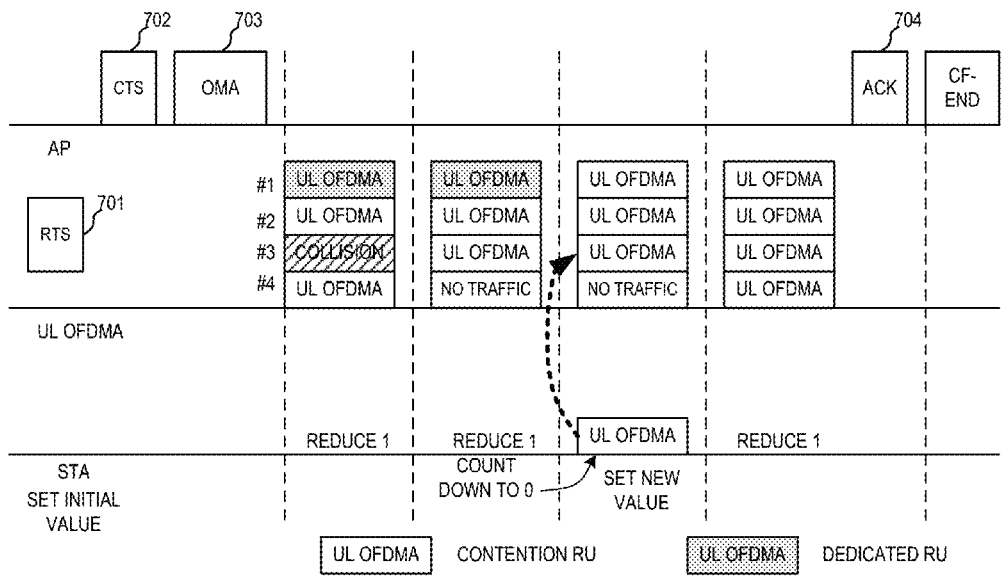
FIG. 7 illustrates one embodiment of contention-based uplink OFDMA based on RTS+CTS+OMA, where multiple uplink OFDMA transmissions are followed by a single acknowledgement frame.

FIG. 7 illustrates one embodiment of contention-based uplink OFDMA based on RTS+CTS+OMA, where multiple uplink OFDMA transmissions are followed by a single acknowledgement frame. The embodiment of FIG. 7 is similar to the embodiment of FIG. 6. In the embodiment of FIG. 7, the uplink OFDMA operation is triggered by one of the STAs by sending an RTS 701 frame to the AP. Upon receiving the RTS frame 701, the AP sends a CTS frame 702 followed by an OMA frame 703. The OMA frame 703 specifies the allocated resource units, the start timing and the packet duration for each subsequent OFDMA packet for the next four UL OFDMA opportunities. In this specific embodiment, the AP does not send individual ACK frames after each OFDMA packet transmission. Instead, the AP sends a block ACK frame 704 after all four OFDMA packet transmissions are completed.

Figure 8:
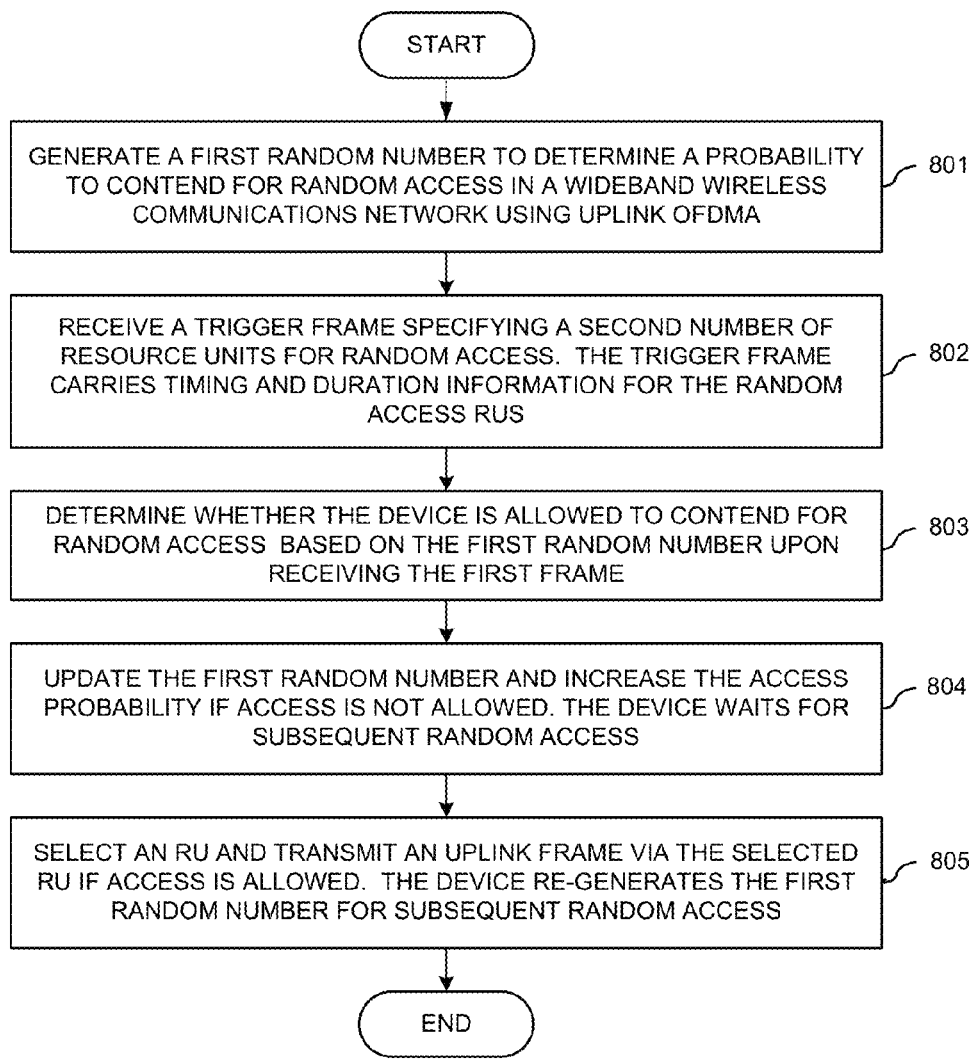
FIG. 8 is a flow chart of a method of performing contention-based uplink OFDMA transmission in accordance with one novel aspect.

FIG. 8 is a flow chart of a method of performing contention-based uplink OFDMA transmission in accordance with one novel aspect. In step 801, a wireless communications device (STA) generates a first random number to determine a probability to contend for random access in a wideband communications network using uplink OFDMA. In step 802, the STA receives a first frame specifying a second number of resource units (RUs) for random access. The first frame carries timing and duration information for the random access RUs. In step 803, the STA determines whether it is allowed to contend for random access based on the first random number upon receiving the first frame. In step 804, if access is not allowed, the STA updates the first random number and increases the access probability. The STA goes to step 802 and waits for subsequent random access. In step 805, if access is allowed, the STA selects an RU and transmits an uplink frame via the selected RU. The STA goes to step 801 and re-generates the first random number for subsequent random access.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for random access, comprising:
   (a) generating a first number to determine a probability to contend for random access in a wideband wireless communications network using uplink orthogonal frequency division multiple access (OFDMA) by a wireless communications device, wherein the first number is randomly generated and a value of the first number is indicative of the probability;
   (b) receiving a first frame specifying a second number of resource units (RUs) from an access point for random access, wherein the first frame carries timing and duration information of the random access RUs;
   (c) determining whether the device is allowed to contend for random access by subtracting the first number by the second number multiplied by a weighting factor upon receiving the first frame;
   (d) updating the first number and increasing the probability to contend for random access if the updated first number is positive and contention is not allowed, wherein the device waits for subsequent random access; and
   (e) selecting an RU in accordance with a predetermined rule and transmitting a second frame via the selected RU if the updated first number reaches zero and contention is allowed, wherein the device re-generates a new first number for subsequent random access.

2. The method of claim 1, wherein the first frame is either a control frame or a trigger frame.

3. The method of claim 1, wherein the second frame is either a data frame, a control frame, or a management frame.

4. The method of claim 1, wherein updating in (d) involves subtracting the first number by the second number multiplied by the weighting factor.

5. The method of claim 1, wherein the weighting factor is a dynamically indicated number provided by the first frame.

6. The method of claim 1, wherein the device re-generates the first number in (e) from an increase-sized window if collision occurs.

7. The method of claim 1, wherein the device initiates the uplink OFDMA by sending a request to send (RTS) frame to the network and in response receiving the first frame from the network in (b).

8. The method of claim 1, wherein the predetermined rule in (e) is for the device to select the resource unit randomly.

9. The method of claim 1, wherein the predetermined rule in (e) is for the device to select the resource unit based on at least one of a channel response, an interference condition, and statistics of collision.

10. A wireless device, comprising:
a random number generator that generates a first number to determine a probability to contend for random access in a wideband wireless communications network using uplink orthogonal frequency division multiple access (OFDMA), wherein the first number is randomly generated and a value of the first number is indicative of the probability;
a receiver that receives a first frame specifying a second number of resource units (RUs) from an access point for random access, wherein the first frame carries timing and duration information for the random access RUs;
a random access handler that determines whether the device is allowed to contend for random access by subtracting the first number by the second number multiplied by a weighting factor upon receiving the first frame, wherein the device updates the first number and increases the access probability if the updated first number is positive and contention is not allowed; and
a transmitter that transmits a second frame via a selected resource unit in accordance with a predetermined rule if the updated first number reaches zero and contention is allowed.

11. The device of claim 10, wherein the first frame is either a control frame or a trigger frame.

12. The device of claim 10, wherein the second frame is either a data frame, a control frame, or a management frame.

13. The device of claim 10, wherein the random access handler updates the first number via subtracting the first number by the second number multiplied by the weighting factor.

14. The device of claim 10, wherein the weighting factor is a dynamically indicated number provided by the first frame.

15. The device of claim 10, wherein the device re-generates the first number from an increase-sized window if collision occurs.

16. The device of claim 10, wherein the device initiates the uplink OFDMA by sending a request to send (RTS) frame to the network and in response receives the first frame from the network.

17. The device of claim 10, wherein the predetermined rule is for the device to select the resource unit randomly.

18. The device of claim 10, wherein the predetermined rule is for the device to select the resource unit based on at least one of a channel response, an interference condition, and statistics of collision.

\* \* \* \* \*